(12) United States Patent
Nam et al.

(10) Patent No.: US 12,348,320 B2
(45) Date of Patent: Jul. 1, 2025

(54) SEMI-PERSISTENT SCHEDULING TIMER FOR RELIABLE TRANSMISSION

(71) Applicant: QUALCOMM Incorporated, San Diego, CA (US)

(72) Inventors: Wooseok Nam, San Diego, CA (US); Mostafa Khoshnevisan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 17/646,463

(22) Filed: Dec. 29, 2021

(65) Prior Publication Data

US 2023/0208569 A1 Jun. 29, 2023

(51) Int. Cl.
| | |
|---|---|
| *H04W 72/04* | (2023.01) |
| *H04L 1/08* | (2006.01) |
| *H04L 1/18* | (2023.01) |
| *H04L 1/1867* | (2023.01) |
| *H04L 5/00* | (2006.01) |
| *H04W 4/06* | (2009.01) |

(52) U.S. Cl.
CPC ............... *H04L 1/188* (2013.01); *H04L 1/08* (2013.01)

(58) Field of Classification Search
CPC ....... H04L 1/1822; H04L 1/08; H04L 1/1812; H04L 1/188; H04L 1/184; H04L 1/1864; H04W 72/23; H04W 72/20; H04W 72/0413; H04W 72/21; H04W 72/042; H04W 4/06; H04W 4/40; H04W 40/22; H04W 76/10
USPC ........................................................ 370/329
See application file for complete search history.

(56) References Cited

U.S. PATENT DOCUMENTS

| | | | |
|---|---|---|---|
| 7,577,085 B1 | 8/2009 | Narasimhan | |
| 8,767,523 B1 | 7/2014 | Narasimhan | |
| 10,912,102 B2 * | 2/2021 | Shi ........................ | H04L 1/188 |
| 11,470,676 B2 * | 10/2022 | Chen ..................... | H04W 76/40 |

(Continued)

FOREIGN PATENT DOCUMENTS

| | | | | |
|---|---|---|---|---|
| EP | 3823191 A1 | 5/2021 | | |
| WO | WO-2021052467 A1 * | 3/2021 | ............. | H04W 4/06 |

OTHER PUBLICATIONS

Ericsson: "DL HARQ RTT Timer for SPS", 3GPP TSG-RAN WG2 AH 1807, R2-1810189, 3rd Generation Partnership Project, Mobile Competence Centre, 650, Route Des Lucioles, F-06921 Sophia-Antipolis Cedex, France, vol. RAN WG2, No. Montreal, Canada, Jul. 2, 2018-Jul. 6, 2018, Jul. 1, 2018, 3 Pages, XP051467385, The whole document.

(Continued)

*Primary Examiner* — Edan Orgad
*Assistant Examiner* — Vanneilian Calchinthang
(74) *Attorney, Agent, or Firm* — QUALCOMM Incorporated

(57) ABSTRACT

Methods, apparatuses, and computer-readable storage medium for SPS are provided. An example method at a UE includes receiving, from a base station, an SPS PDSCH associated with a HARQ process. The example method may further include initiating an SPS timer for the HARQ process associated with the SPS PDSCH. The example method may further include maintaining the HARQ process to receive HARQ retransmissions associated with the HARQ process until the SPS timer expires.

29 Claims, 12 Drawing Sheets

(56) References Cited

U.S. PATENT DOCUMENTS

| | | | |
|---|---|---|---|
| 11,757,596 B1* | 9/2023 | Saber | H04L 1/1812 |
| | | | 455/450 |
| 2013/0128935 A1 | 5/2013 | Janani et al. | |
| 2016/0119840 A1 | 4/2016 | Loehr et al. | |
| 2017/0099118 A1* | 4/2017 | Negalaguli | H04W 4/02 |
| 2017/0170936 A1 | 6/2017 | Sundararajan et al. | |
| 2018/0139734 A1* | 5/2018 | Babaei | H04W 72/23 |
| 2018/0219662 A1 | 8/2018 | Kim et al. | |
| 2018/0254851 A1 | 9/2018 | Roessel et al. | |
| 2019/0132228 A1 | 5/2019 | Tang | |
| 2019/0150180 A1* | 5/2019 | Zou | H04L 1/1812 |
| | | | 370/329 |
| 2021/0006362 A1* | 1/2021 | Loehr | H04L 1/1819 |
| 2021/0084647 A1* | 3/2021 | Takeda | H04L 1/1887 |
| 2021/0184812 A1* | 6/2021 | MolavianJazi | H04L 1/0041 |
| 2021/0329593 A1* | 10/2021 | Lee | H04W 68/02 |
| 2022/0078771 A1* | 3/2022 | Jang | H04W 52/54 |
| 2022/0217715 A1* | 7/2022 | Bae | H04W 72/21 |
| 2023/0112147 A1* | 4/2023 | Chien | H04L 1/1861 |
| | | | 370/329 |
| 2023/0361938 A1* | 11/2023 | He | H04L 1/1832 |

OTHER PUBLICATIONS

International Search Report and Written Opinion—PCT/US2022/053569—ISA/EPO—Apr. 28, 2023.

* cited by examiner

SEMI-PERSISTENT SCHEDULING TIMER FOR RELIABLE TRANSMISSION

TECHNICAL FIELD

The present disclosure relates generally to communication systems, and more particularly, to wireless communication systems with semi-persistent scheduling (SPS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive, from a base station, an SPS physical downlink shared channel (PDSCH) associated with a hybrid automatic repeat request (HARQ) process. The memory and the at least one processor coupled to the memory may be further configured to initiate an SPS timer for the HARQ process associated with the SPS PDSCH. The memory and the at least one processor coupled to the memory may be further configured to maintain the HARQ process to receive HARQ retransmissions associated with the HARQ process until the SPS timer expires.

In another aspect of the disclosure, a method, a computer-readable medium, and an apparatus at a base station are provided. The apparatus may include a memory and at least one processor coupled to the memory. The memory and the at least one processor coupled to the memory may be configured to transmit, to a UE, an SPS PDSCH associated with a HARQ process. The memory and the at least one processor coupled to the memory may be further configured to transmit, to the UE, an indication indicating a termination of an SPS timer for the HARQ process.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
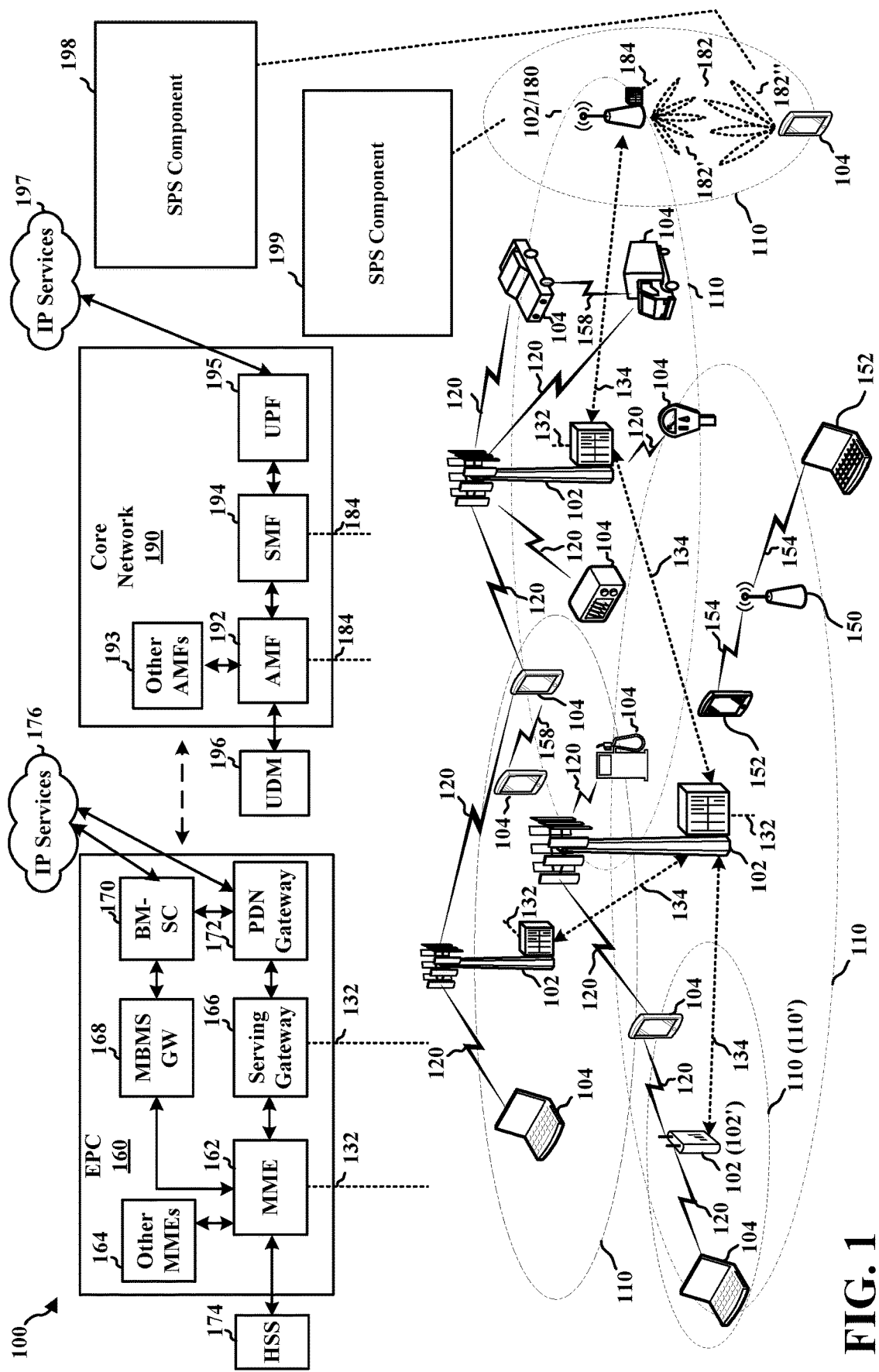
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information. The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services. The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an SPS component 198. In some aspects, the SPS component 198 may be configured to receive, from a base station, an SPS PDSCH associated with a HARQ process. In some aspects, the SPS component 198 may be further configured to initiate an SPS timer for the HARQ process associated with the SPS PDSCH. In some aspects, the SPS component 198 may be further configured to maintain the HARQ process to receive HARQ retransmissions associated with the HARQ process until the SPS timer expires.

In certain aspects, the base station 180 may include an SPS component 199. In some aspects, the SPS component 199 may be configured to transmit, to a UE, an SPS PDSCH associated with a HARQ process. In some aspects, the SPS component 199 may be further configured to transmit, to the UE, an indication indicating a termination of an SPS timer for the HARQ process.

Although the following description may be focused on 5G NR, the concepts described herein may be applicable to other similar areas, such as LTE, LTE-A, CDMA, GSM, and other wireless technologies.

Figure 2:
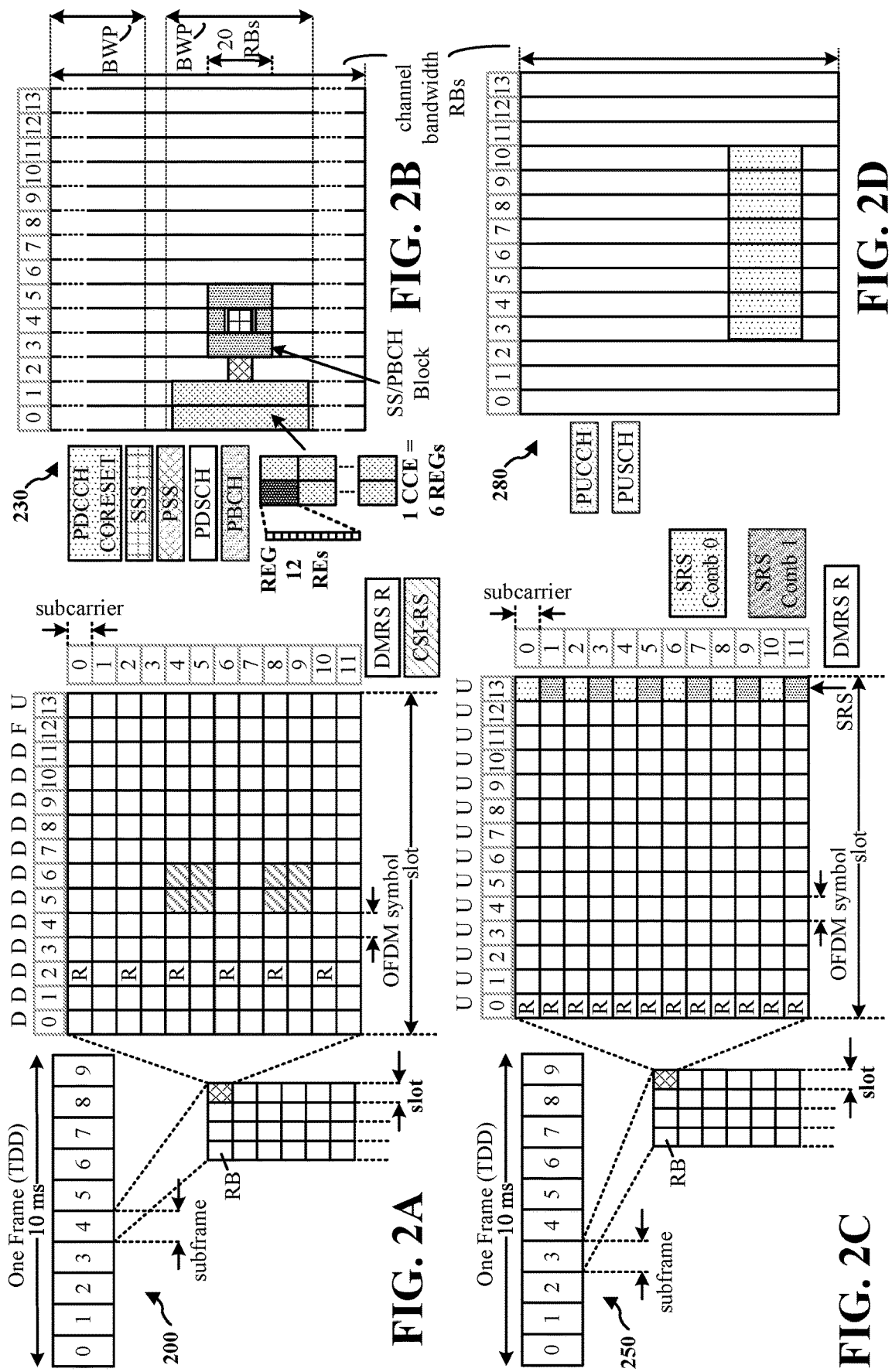
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
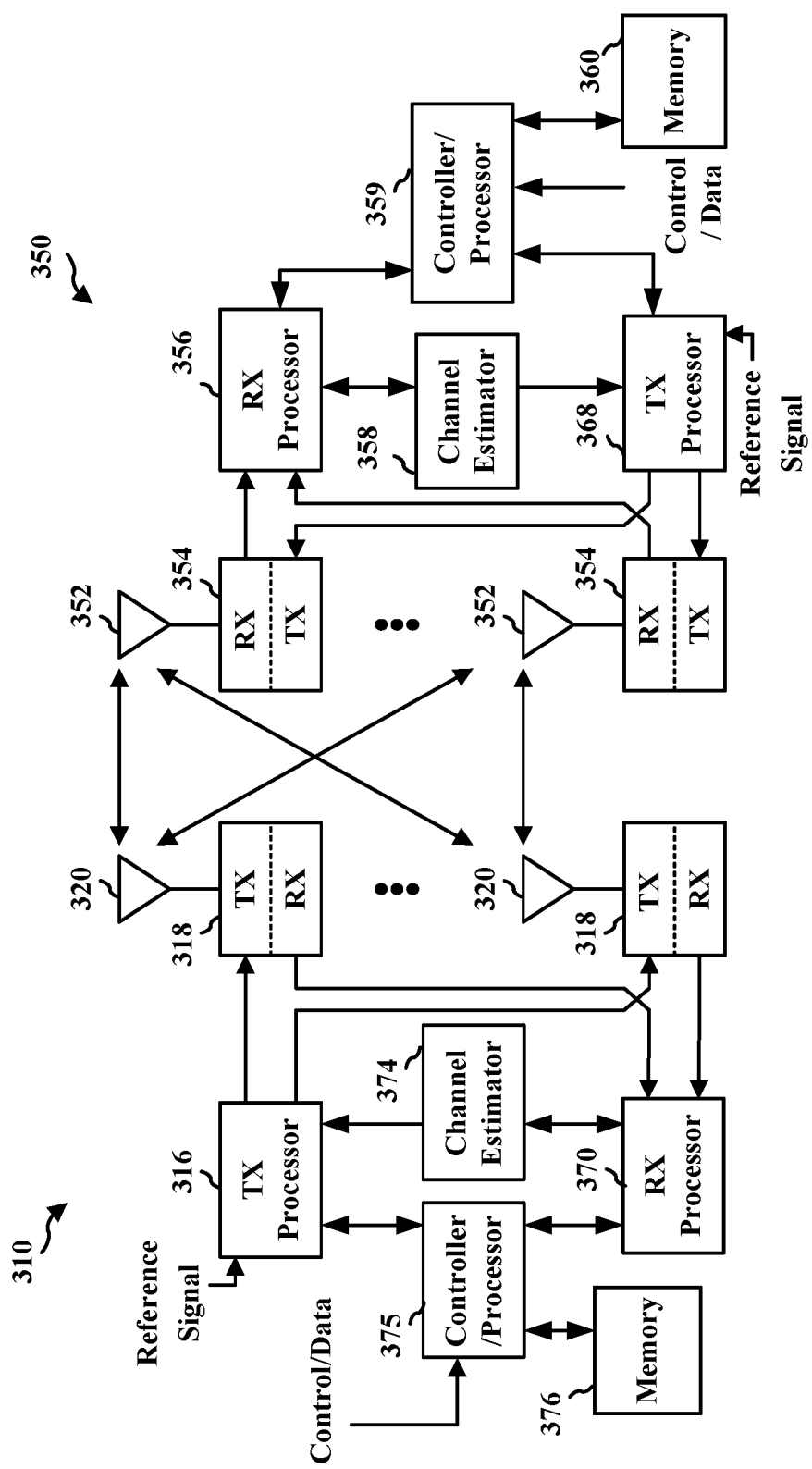
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization. Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with SPS component 198 of FIG. 1.

At least one of the TX processor 316, the RX processor 370, and the controller/processor 375 may be configured to perform aspects in connection with SPS component 199 of FIG. 1.

Downlink (DL) SPS may be used in wireless communication systems. The SPS based allocation may be a transmission mode in which the serving base station allocates at least a part of resources and transport formats to the UE semi-statically over a certain time interval. In the downlink, the semi-persistent scheduling may be configured via RRC signaling per serving cell and per bandwidth part (BWP). Multiple SPS configurations may be active simultaneously on different serving cells. Activation and deactivation of the SPS may be independent across serving cells. For example, in DL SPS, a downlink assignment may be provided by a PDCCH, and may be stored or cleared based on layer-1 (L1) signaling indicating SPS activation or deactivation.

Periodic resources for DL data transmission, such as an SPS PDSCH, may be configured via RRC signaling. For example, a base station may configure SPS PDSCH resources via an information element (IE) for SPS configuration, such as an SPS-Config IE. For SPS, RRC parameters may include configured scheduling (CS) radio network temporary identifier (CS-RNTI) for activation, deactivation, and retransmission. As another example, RRC parameters may further include a number of configured HARQ processes for SPS, which may be represented by a parameter, such as a nrofHARQ-Processes parameter. For SPS, RRC parameters may further include a periodicity of configured downlink assignment for SPS.

After being activated, such as activated by SPS-activation DCI, an SPS PDSCH may be transmitted periodically without a scheduling PDCCH. For example, an SPS PDSCH can be transmitted periodically without a scheduling PDCCH until an SPS PDSCH is deactivated by SPS-release DCI. The SPS-activation and release DCIs may be cyclic redundancy check (CRC) scrambled by CS-RNTI. SPS may serve periodic traffic more efficiently without control signaling overhead.

In some wireless communication systems, more than one SPS (e.g., up to 8) configuration per carrier may be configured whereas one SPS per carrier may be configured in some other wireless communication systems. With more than one SPS configuration per carrier configured, a periodicity of configured downlink assignment for SPS may be smaller, by way of example, as small as one slot. Separate repetition factor configurations from a dynamic grant PDSCH may be configured for an SPS PDSCH. For such SPS with more than one SPS configuration per carrier, RRC parameters may also include an SPS configuration index, such as an SPS configuration index represented by sps-ConfigIndex, a HARQ process identifier (ID) offset which may be represented by harq-ProcID-Offset, a periodicity, a HARQ codebook ID, a PDSCH aggregation factor (representing a number of consecutive slots scheduled by DCI for a PDSCH), or the like.

In some wireless communication systems, for a HARQ process for SPS, each SPS PDSCH transmission occasion may be regarded as a new transmission. For example, a new data indicator (NDI) field for a corresponding HARQ process may be considered by a UE to be toggled (represented by value "1" or a value "0"). Unlike a dynamic grant, where the HARQ process ID may be assigned by the scheduling PDCCH, the HARQ process ID of SPS may be determined based on the slot in which the SPS PDSCH is transmitted.

For example, for downlink assignments received on the PDCCH may indicate that there is a transmission on a downlink shared channel (DL-SCH) for a particular medium access control (MAC) entity and may provide the relevant HARQ information. When the MAC entity has a cell (C) radio network temporary identifier (C-RNTI), temporary C-RNTI, or CS-RNTI, for each PDCCH occasion during which it monitors the PDCCH and for each serving cell, if a downlink assignment for this PDCCH occasion and this serving cell has been received on the PDCCH for the MAC entity's C-RNTI or temporary C-RNTI and if this is the first downlink assignment for this temporary C-RNTI, then the NDI may be considered to have been toggled. In addition, if the downlink assignment is for the MAC entity's C-RNTI, and if the previous downlink assignment indicated to the HARQ entity of the same HARQ process was either a downlink assignment received for the MAC entity's CS-RNTI or a configured downlink assignment, the NDI may be considered to be toggled regardless of the value of the NDI. The MAC entity may indicate the presence of a downlink assignment and deliver the associated HARQ information to the HARQ entity.

If a downlink assignment for the PDCCH occasion has been received for the serving cell on the PDCCH for the MAC entity's CS-RNTI, and if the NDI in the received HARQ information is 1, the NDI for the corresponding HARQ process may be considered to be not toggled. The MAC entity may further indicate the presence of a downlink assignment for the serving cell and deliver the associated HARQ information to the HARQ entity. If the NDI in the received HARQ information is 0 and if PDCCH contents indicate an SPS deactivation, the MAC entity may clear the configured downlink assignment for the serving cell. If PDCCH content indicates SPS activation, the MAC entity may store the downlink assignment for the serving cell and the associated HARQ information as a configured downlink assignment and initialize or re-initialize the configured downlink assignment for the serving cell to start in the associated PDSCH duration.

For each serving cell and each configured downlink assignment, if configured and activated, the MAC entity may (if the PDSCH duration of the configured downlink assignment does not overlap with the PDSCH duration of a downlink assignment received on the PDCCH for this serving cell) 1) instruct the physical layer to receive, in this PDSCH duration, a transport block on the DL-SCH according to the configured downlink assignment and to deliver it to the HARQ entity, 2) set the HARQ process ID to the HARQ process ID associated with this PDSCH duration, 3) consider the NDI bit for the corresponding HARQ process to have been toggled, and 4) indicate the presence of a configured downlink assignment and deliver the stored HARQ information to the HARQ entity.

For configured downlink assignments without harq-ProcID-Offset, the HARQ process ID associated with the slot where the DL transmission starts is derived from the following equation:

$$\text{HARQ Process ID} = [\text{floor}(\text{CURRENT\_slot} \times 10 / (\text{numberOfSlotsPerFrame} \times \text{periodicity}))] \bmod \text{nrof-HARQ-Processes} + \text{harq-ProcID-Offset}$$

The parameter CURRENT_slot=[(SFN×numberOfSlotsPerFrame)+slot number in the frame] and numberOfSlotsPerFrame may represent the number of consecutive slots per frame. For different SPS PDSCH occasions, total nrofHARQ-Processes HARQ processes IDs may be reused. For HARQ retransmission of an SPS PDSCH, a dynamic PDSCH scheduled by DCI with CRC scrambled by CS-RNTI may be used.

A UE may identify the retransmission grant from NDI and HARQ process ID fields in the DCI. The NDI field may distinguish between an SPS retransmission grant and SPS activation/release DCI. The HARQ process ID field may indicate which SPS PDSCH occasion the retransmission is associated.

In some wireless communication systems, the total number of HARQ processes may be limited for a UE. Therefore, if the number of SPS configuration increases, the number of HARQ processes per SPS (which may be represented by nrofHARQ-Processes) may be limited. If the periodicity of SPS is short, SPS occasions with the same HARQ ID may occur more frequently. If the HARQ retransmission for an SPS PDSCH is incomplete (i.e., UE reports NACK for the HARQ process and is expecting retransmission) until the occurrence of the next SPS PDSCH occasion with the same HARQ ID, the same HARQ entity may be overwritten with the new transmission. Therefore, the incomplete HARQ process may be discarded and may need an upper layer (e.g., RLC) ARQ to recover. Alternatively, realizing that the HARQ process is discarded, the physical layer (PHY) of base station may retransmit the same transport block as a new transmission in a later SPS occasion, but the previous (re-) transmissions may not be used for HARQ combining.

Figure 4:
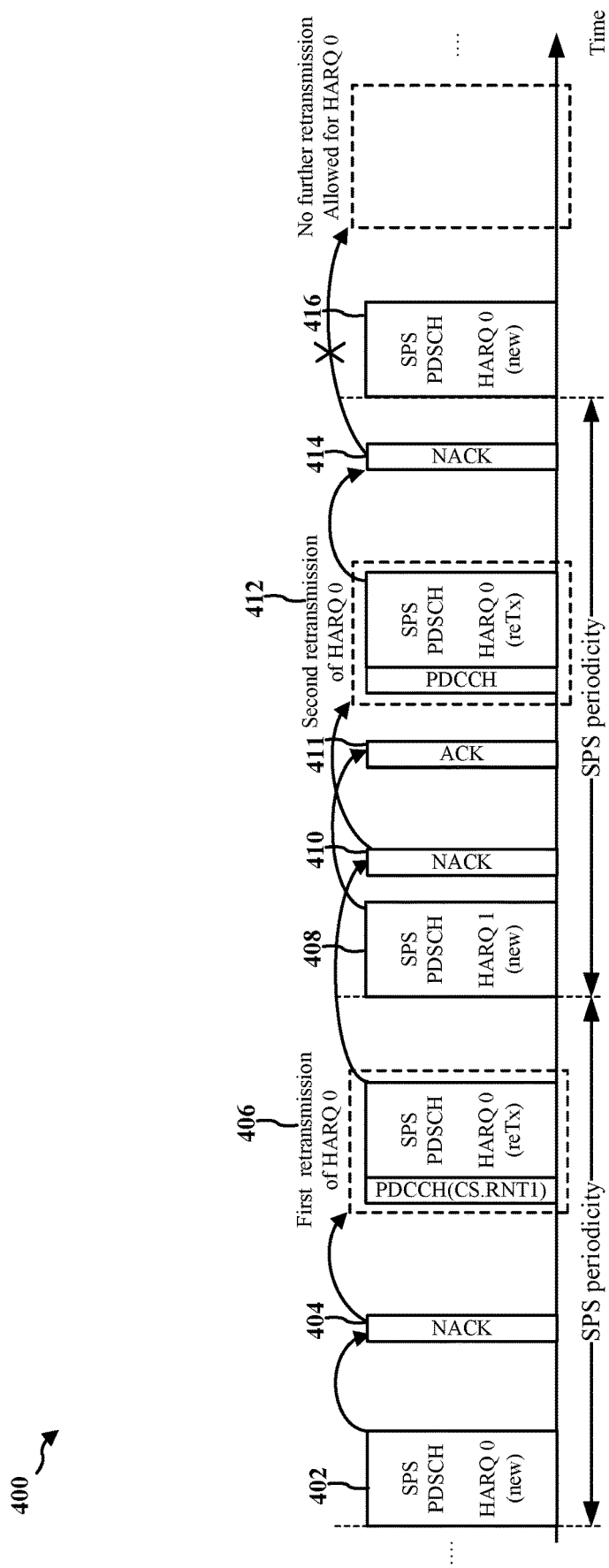
FIG. 4 is a diagram illustrating example signals exchanged between a UE and a base station.

FIG. 4 is a diagram 400 illustrating example signals exchanged between a UE and a base station. As illustrated in FIG. 4, a base station may transmit an SPS PDSCH 402 to a UE and the SPS PDSCH 402 may be associated with a HARQ process ID 0 representing a new HARQ process. The UE may fail to receive the SPS PDSCH 402 and transmit, to the base station, a negative acknowledgment (NACK) 404 representing the failure of receiving data associated with the SPS PDSCH 402. Based on receiving the NACK 404 from the UE, the base station may retransmit the SPS PDSCH in a first retransmission 406 which may still be associated with the HARQ process ID 0.

Before receiving a NACK or ACK for the first retransmission 406 from the UE, the base station may transmit another new SPS PDSCH 408 associated with a new HARQ process ID 1 to the UE. The UE may fail to receive the first retransmission 406 and may transmit, to the base station, a NACK 410 representing the failure of receiving data associated with the first retransmission 406. The UE may also transmit an ACK 411 representing successfully receiving data associated with the SPS PDSCH 408.

After the base station receives the NACK 410 representing failure of receiving data associated with the first retransmission 406, the base station may attempt to retransmit a second retransmission on HARQ process ID 0 and retransmit SPS PDSCH 412 to the UE. The UE may again fail to receive the second retransmission 412 and may transmit, to the base station, a NACK 414 representing the failure of receiving data associated with the second retransmission 412. Upon receiving the NACK 414, the base station may attempt to retransmit a third retransmission of the SPS PDSCH associated with the HARQ process ID 0. However, because the HARQ process may be rewritten due to a new SPS PDSCH 416 associated with the same HARQ process ID, the base station may not be able to retransmit the SPS PDSCH associated with the HARQ process ID 0 and further retransmissions on the HARQ process ID 0 may not be allowed.

Aspects provided herein configure an SPS timer for maintaining a HARQ process associated with the SPS. For example, for each HARQ process of an active SPS, an SPS timer may be defined. The SPS timer may indicate a time window that the UE expects to receive a potential HARQ retransmission of the corresponding HARQ process ID. By utilizing the SPS timer, rewritten HARQ process IDs that may cause inefficiencies in the transmission may be avoided.

Figure 5:
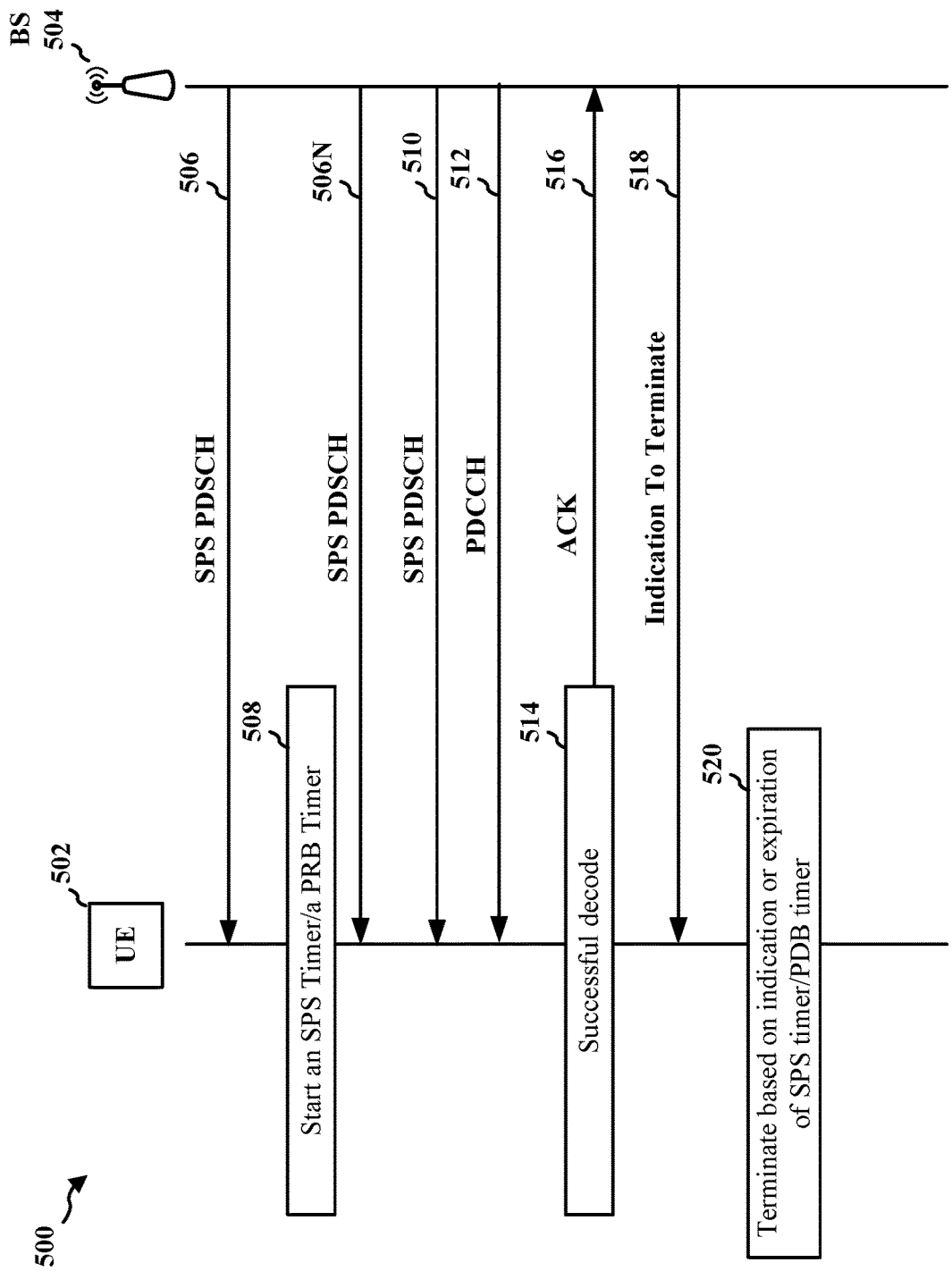
FIG. 5 is a diagram illustrating an example communication flow between a UE and a base station.

FIG. 5 is a diagram 500 illustrating an example communication flow between a UE 502 and a base station 504. As illustrated in FIG. 5, the UE 502 may receive an SPS PDSCH 506 associated with a HARQ process ID from the base station 504. Upon receiving the SPS PDSCH 506, the UE 502 may start an SPS timer at 508. In some aspects, the value of the SPS timer (e.g., and the associated window size) may be semi-statically configured, by way of example, per-UE, per-carrier, or per-SPS configuration. In some aspects, for an SPS occasion associated with a HARQ process ID, if the SPS timer for the HARQ process is not running, the UE 502 may start the SPS timer upon receiving, such as the SPS PDSCH, in the SPS occasion. In some aspects, if a PDCCH with CS-RNTI and NDI=1, such as a PDCCH 512, is received for the HARQ process ID (i.e., HARQ retransmission of the SPS PDSCH 506), the UE 502 may start or restart the SPS timer for the HARQ process. In some aspects, if a PDCCH with C-RNTI, such as the PDCCH 512, is received for the HARQ process ID, the UE 502 may start or restart the SPS timer. In some aspects, if the UE 502 reports a NACK for a PDSCH transmission (e.g., the SPS PDSCH 506), the UE 502 may start or restart the SPS timer for the corresponding HARQ process.

In some aspects, if the UE 502 successfully decodes the data of the HARQ process at 512 and reports a positive ACK 516, the UE may stop the SPS timer.

In some aspects, under a first option, while the SPS timer is running (within the window), the UE may not be expected to receive a new transmission on an SPS occasion associated with the same HARQ process ID. In some aspects, the SPS occasion, such as an SPS PDSCH 510, with the same HARQ process ID may be skipped. In some aspects, the UE 502 may not report a HARQ-ACK information bit for the skipped SPS occasion. In some aspects, the UE 502 may exclude the skipped SPS occasion when resolving multiple overlapping SPSs. For example, when multiple SPS occasions overlap in time, one SPS with the lowest SPS configuration index among the overlapping SPSs that are not skipped may be transmitted. In some aspects, the UE 502 may continue to receive HARQ retransmissions, such as the SPS PDSCH 506N, for the corresponding HARQ process ID.

In some aspects, under a second option, while the SPS timer is running for a HARQ process, the UE 502 may treat a transmission on an SPS occasion (e.g., the SPS PDSCH 510) with the same HARQ process ID as a retransmission of the previous PDSCH transmission (e.g., the SPS PDSCH 506). In some aspects, the UE 502 may consider the NDI bit for the corresponding HARQ process to be not toggled. In some aspects, the previous PDSCH transmission may be an SPS PDSCH 506 or a dynamic-grant PDSCH with a same HARQ process ID. In some aspects, a redundancy version (RV) for the retransmission on the SPS occasion (e.g., SPS PDSCH 510) may be fixed (e.g., the RV indicated by the activation DCI), or determined based on the RV of the previous retransmission (e.g., (previous RV+offset) mod 4, where the 'offset' may be configurable, or based on a predetermined sequence).

In some aspects, the first option and the second option may be dynamically selected based on a condition or semi-statically configured. In some aspects, the condition or configuration, or the application of the first option or the second option, may be common for all SPSs of a carrier, common across all carriers, or per SPS. In some aspects, if the distance from the previous PDSCH transmission (e.g., the SPS PDSCH 506) and the SPS occasion (e.g., the SPS PDSCH 510) is closer than a threshold, there may not be enough time for the base station 504 and the UE 502 to process the retransmission and the second option may not be applied (and the first option may be applied). In some aspects, the second option may be applied if the UE 502 has already transmitted HARQ-ACK (i.e., NACK) for the previous PDSCH transmission (e.g., the SPS PDSCH 506) before the SPS occasion (e.g., the SPS PDSCH 510) (e.g., ACK 516 before the SPS PDSCH 510). In some aspects, the distance from the previous PDSCH transmission (or the corresponding HARQ-ACK) to the SPS occasion satisfies a minimum distance specification (e.g., by configuration or UE capability). In some aspects, if the second option is not applied, the first option may be applied.

In some aspects, the base station 504 may indicate a termination of the SPS timer before the SPS timer expires by transmitting an indication to terminate 518. Upon receiving the indication to terminate 518, the UE may accordingly terminate the SPS timer at 520. Alternatively, the UE may terminate the SPS timer at 520 based on an expiration of the SPS timer. In some aspects, the base station 504 may transmit the indication to terminate 518 based on a packet delay budget (PDB) of an SPS. For example, if the PDB has exceeded, the base station 504 may stop retransmission and terminate the HARQ process by transmitting the indication to terminate 518. In some aspects, the indication to terminate 518 may be explicit and may be carried by DCI or a MAC-CE. In some aspects, the indication to terminate 518 may be implicit. For example, if a PDCCH with C-RNTI with the same HARQ process ID (e.g., the PDCCH 512) is received, the SPS timer is terminated. In some aspects, the UE 502 may initiate another timer, such as a PDB timer, that may indicate a lifetime of a DL packet. The PDB timer may start with a new SPS transmission on an SPS occasion, such as the SPS PDSCH 506. If the PDB timer expires, the SPS timer for the corresponding HARQ process may also be regarded as terminated.

Figure 6:
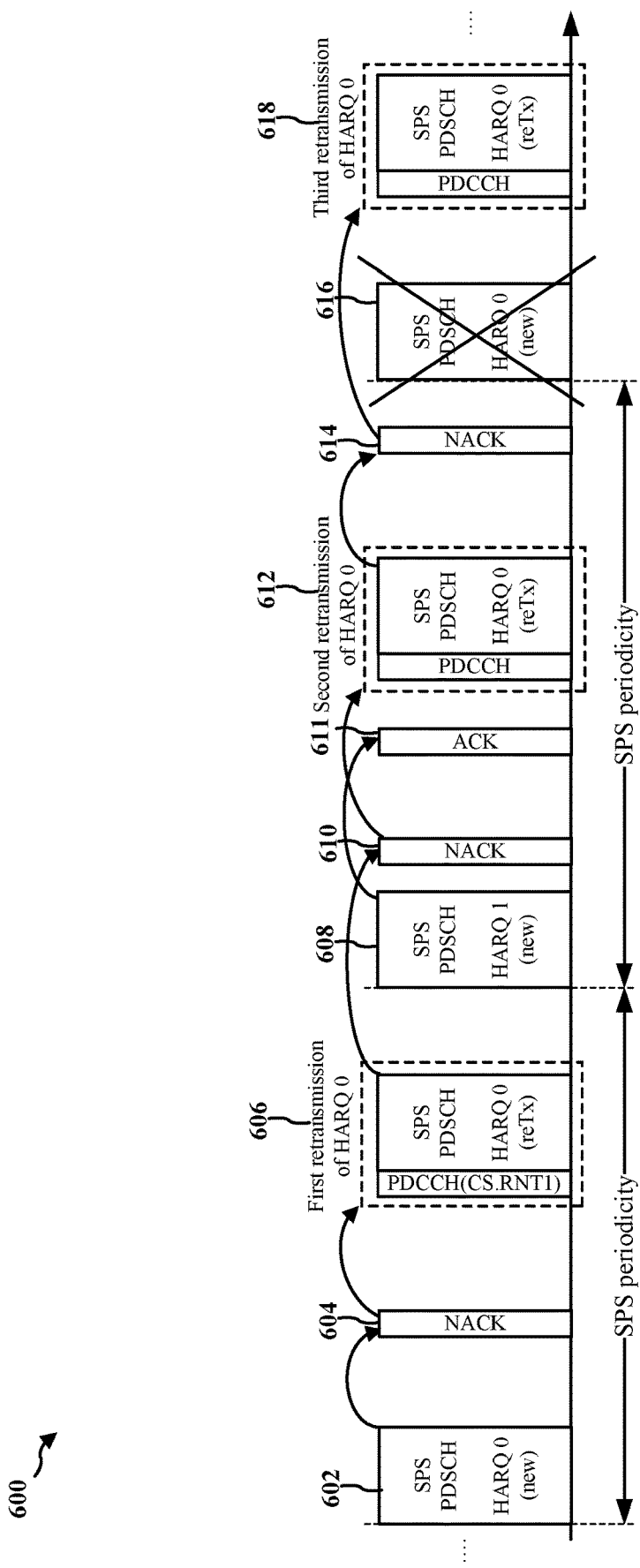
FIG. 6 is a diagram illustrating example signals exchanged between a UE and a base station.

FIG. 6 is a diagram 600 illustrating example signals exchanged between a UE and a base station under the first option. As illustrated in FIG. 6, a base station may transmit an SPS PDSCH 602 to a UE and the SPS PDSCH 602 may be associated with a HARQ process ID 0 representing a new HARQ process. The UE may fail to receive the SPS PDSCH 602 and may transmit, to the base station, a NACK 604 representing failure of receiving data associated with the SPS PDSCH 602. Based on receiving the NACK 604 from the UE, the base station may retransmit the SPS PDSCH in a first retransmission 606 which may still be associated with the HARQ process ID 0. The UE may start the SPS timer based on the reception of the PDCCH scheduling the first retransmission 606 associated with the HARQ process ID 0.

Before receiving a NACK or ACK from the UE, the base station may transmit another new SPS PDSCH 608 associated with a new HARQ process ID 1 to the UE. The UE may fail to receive the first retransmission including the SPS PDSCH 606 and may transmit, to the base station, a NACK 610 representing failure of receiving data associated with the first retransmission including the SPS PDSCH 606. The UE may also transmit an ACK 611 representing successfully receiving data associated with the SPS PDSCH 608.

After the base station receives the NACK 610 representing failure of receiving data associated with the first retransmission including the SPS PDSCH 608, the base station may attempt to retransmit a second retransmission on HARQ process ID 0 and retransmit SPS PDSCH 612 to the UE. The UE may restart the SPS timer upon reception of the PDCCH associated with the second retransmission on HARQ process ID 0. The UE may again fail to receive the SPS PDSCH 612 and may transmit, to the base station, a NACK 614 representing failure of receiving data associated with the second retransmission including the SPS PDSCH 612. Upon receiving the NACK 614, the base station may attempt to retransmit a third retransmission of the SPS PDSCH associated with the HARQ process ID 0. A new SPS PDSCH 616 associated with the same HARQ process ID may not be received by the UE and may not be processed, based on the SPS timer is running during the SPS occasion 616, causing no overwrite on the HARQ process. Therefore, the base station may able to retransmit the SPS PDSCH 618 associated with the HARQ process ID 0 on the third retransmission.

Figure 7:
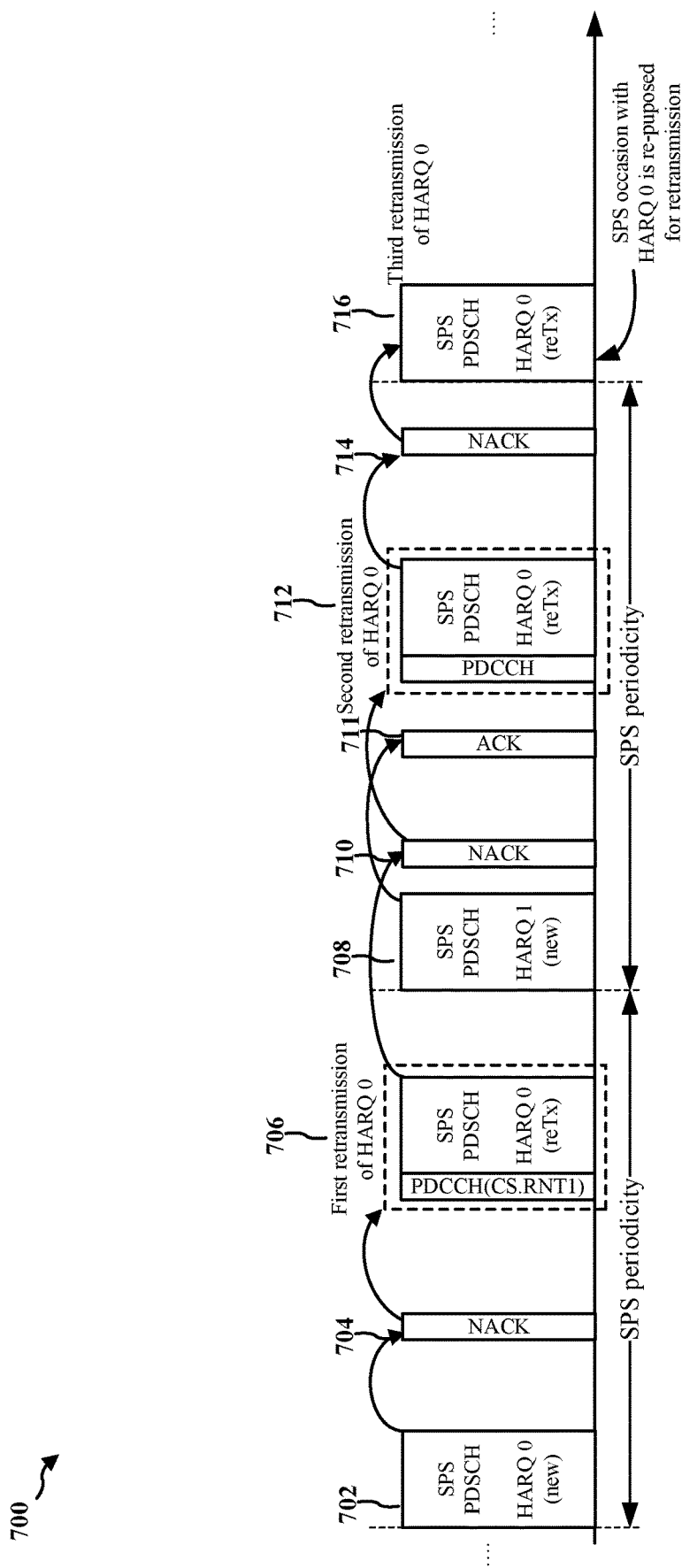
FIG. 7 is a diagram illustrating example signals exchanged between a UE and a base station.

FIG. 7 is a diagram 700 illustrating example signals exchanged between a UE and a base station under the second option. As illustrated in FIG. 7, a base station may transmit an SPS PDSCH 702 to a UE and the SPS PDSCH 702 may be associated with a HARQ process ID 0 representing a new HARQ process. The UE may fail to receive the SPS PDSCH 702 and may transmit, to the base station, a NACK 704 representing failure of receiving data associated with the SPS PDSCH 702. Based on receiving the NACK 704 from the UE, the base station may retransmit the SPS PDSCH in a first retransmission 706 which may still be associated with the HARQ process ID 0. The UE may start the SPS timer based on the reception of the PDCCH scheduling the first retransmission 706 associated with the HARQ process ID 0.

Before receiving NACK or ACK from the UE, the base station may transmit another new SPS PDSCH 708 associated with a new HARQ process ID 1 to the UE. The UE may fail to receive the SPS PDSCH 708 and may transmit, to the base station, a NACK 710 representing failure of receiving data associated with the first retransmission including the SPS PDSCH 708. The UE may also transmit an ACK 711 representing successfully receiving data associated with the SPS PDSCH 708.

After the base station receives the NACK 710 representing failure of receiving data associated with the first retransmission including the SPS PDSCH 708, the base station may attempt to retransmit a second retransmission on HARQ process ID 0 and retransmit SPS PDSCH 712 to the UE. The UE may again fail to receive the SPS PDSCH 712 and may transmit, to the base station, a NACK 714 representing failure of receiving data associated with the second retransmission including the SPS PDSCH 712. The UE may restart the SPS timer upon reception of the PDCCH associated with the second retransmission on HARQ process ID 0. Upon receiving the NACK 714, the base station may attempt to retransmit a third retransmission of the SPS PDSCH associated with the HARQ process ID 0. The UE may treat a new SPS PDSCH 716 associated with the same HARQ process ID as a retransmission of the SPS PDSCH, and the retransmission may be successfully performed.

Figure 8:
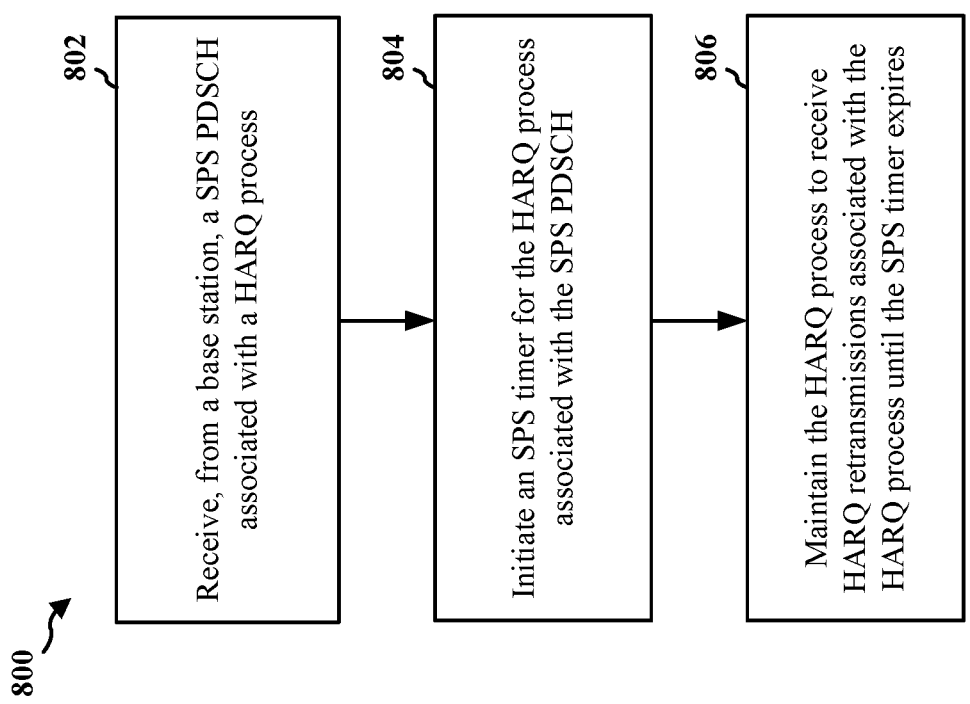
FIG. 8 is a flowchart of a method of wireless communication.

FIG. 8 is a flowchart 800 of a method of wireless communication. The method may be performed by a UE (e.g., the UE 104, the UE 502; the apparatus 1102).

At 802, the UE may receive, from a base station, an SPS PDSCH associated with a HARQ process. For example, the UE 502 may receive, from a base station 504, an SPS PDSCH 806 associated with a HARQ process. In some aspects, 802 may be performed by SPS component 1140 in FIG. 11.

At 804, the UE may initiate an SPS timer for the HARQ process associated with the SPS PDSCH. For example, the UE 502 may initiate an SPS timer at 508 for the HARQ process associated with the SPS PDSCH. In some aspects, 804 may be performed by SPS component 1140 in FIG. 11. In some aspects, the SPS timer may be initiated or reinitiated for the HARQ process based on a PDCCH associated with a CS-RNTI associated with an ID of the HARQ process. In some aspects, the PDCCH may be associated with a NDI of value 1. In some aspects, the SPS timer may be one-to-one associated with the HARQ process. In some aspects, the SPS timer may be initiated for the HARQ process based on a NACK associated with the SPS PDSCH. In some aspects, the SPS timer may be initiated or reinitiated for the HARQ process based on a PDCCH associated with a C-RNTI associated with an ID of the HARQ process. In some aspects, the SPS timer may be initiated for the HARQ process based on receiving the SPS PDSCH if the SPS timer is not yet initiated based on other conditions when receiving the SPS PDSCH. In some aspects, a value of the SPS timer corresponding to a window size may be semi-statically configured per UE, per carrier, or per SPS configuration.

At 806, the UE may maintain the HARQ process to receive HARQ retransmissions associated with the HARQ process until the SPS timer expires. For example, the UE 502 may maintain the HARQ process to receive HARQ retransmissions associated with the HARQ process until the SPS timer expires. In some aspects, 806 may be performed by SPS component 1140 in FIG. 11.

Figure 9:
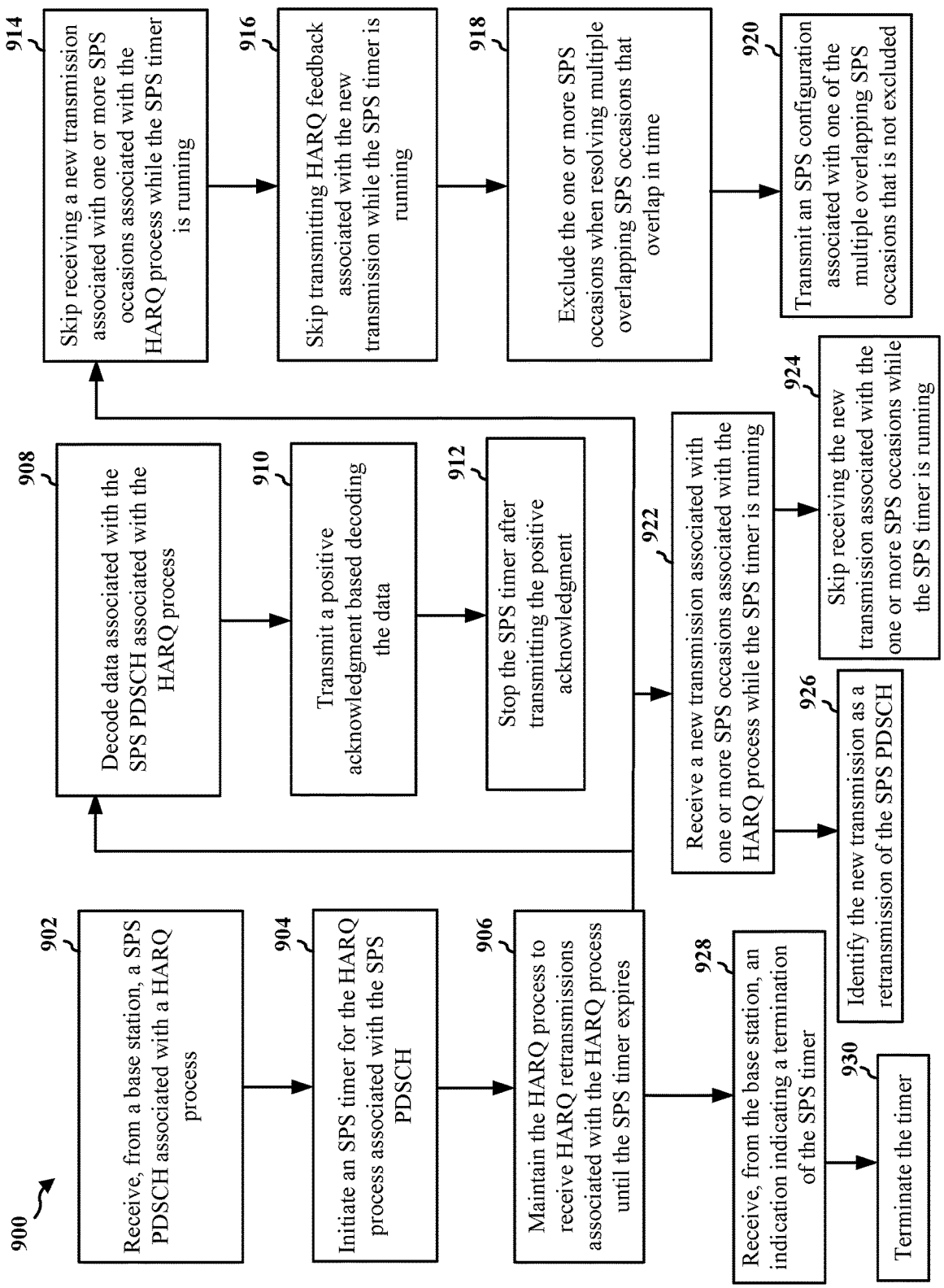
FIG. 9 is a flowchart of a method of wireless communication.

FIG. 9 is a flowchart 900 of a method of wireless communication. The method may be performed by a UE (e.g., the UE 104, the UE 502; the apparatus 1102).

At 902, the UE may receive, from a base station, an SPS PDSCH associated with a HARQ process. For example, the UE 502 may receive, from a base station 504, an SPS PDSCH 906 associated with a HARQ process. In some aspects, 902 may be performed by SPS component 1140 in FIG. 11.

At 904, the UE may initiate an SPS timer for the HARQ process associated with the SPS PDSCH. For example, the UE 502 may initiate an SPS timer at 508 for the HARQ process associated with the SPS PDSCH. In some aspects, 904 may be performed by SPS component 1140 in FIG. 11. In some aspects, the SPS timer may be initiated or reinitiated for the HARQ process based on a PDCCH associated with a CS-RNTI associated with an ID of the HARQ process. In some aspects, the PDCCH may be associated with a NDI of value 1. In some aspects, the SPS timer may be one-to-one associated with the HARQ process. In some aspects, the SPS timer may be initiated for the HARQ process based on a NACK associated with the SPS PDSCH. In some aspects, the SPS timer may be initiated or reinitiated for the HARQ process based on a PDCCH associated with a C-RNTI associated with an ID of the HARQ process. In some aspects, the SPS timer may be initiated for the HARQ process based on receiving the SPS PDSCH if the SPS timer is not yet initiated based on other conditions when receiving the SPS PDSCH. In some aspects, a value of the SPS timer corresponding to a window size may be semi-statically configured per UE, per carrier, or per SPS configuration.

At 906, the UE may maintain the HARQ process to receive HARQ retransmissions associated with the HARQ process until the SPS timer expires. For example, the UE 502 may maintain the HARQ process to receive HARQ retransmissions associated with the HARQ process until the SPS timer expires. In some aspects, 906 may be performed by SPS component 1140 in FIG. 11.

At 908, the UE may decode data associated with the SPS PDSCH associated with the HARQ process. For example, the UE 502 may decode data associated with the SPS PDSCH associated with the HARQ process at 514. In some aspects, 908 may be performed by SPS component 1140 in FIG. 11.

At 910, the UE may transmit a positive acknowledgment based on decoding the data. For example, the UE 502 may transmit a positive ACK 516 based on decoding the data. In some aspects, 910 may be performed by SPS component 1140 in FIG. 11.

At 912, the UE may stop the SPS timer after transmitting the positive acknowledgment. For example, the UE 502 may stop the SPS timer at 520 after transmitting the positive acknowledgment. In some aspects, 912 may be performed by SPS component 1140 in FIG. 11.

At 914, the UE may skip receiving a new transmission associated with one or more SPS occasions associated with the HARQ process while the SPS timer may be running. For example, the UE 502 may skip receiving a new transmission associated with one or more SPS occasions (such as the SPS PDSCH 510) associated with the HARQ process while the SPS timer may be running. In some aspects, 914 may be performed by SPS component 1140 in FIG. 11.

At 916, the UE may skip transmitting HARQ feedback associated with the new transmission while the SPS timer may be running. For example, the UE 502 may skip transmitting HARQ feedback associated with the new transmission while the SPS timer may be running. In some aspects, 916 may be performed by SPS component 1140 in FIG. 11.

At 918, the UE may exclude the one or more SPS occasions when resolving multiple overlapping SPS occasions that overlap in time, where the multiple overlapping SPS occasions may include the one or more SPS occasions. For example, the UE 502 may exclude the one or more SPS occasions when resolving multiple overlapping SPS occasions that overlap in time, where the multiple overlapping SPS occasions may include the one or more SPS occasions. In some aspects, 918 may be performed by SPS component 1140 in FIG. 11.

At 920, the UE may transmit an SPS configuration associated with one of the multiple overlapping SPS occasions that may be not excluded. For example, the UE 502 may transmit an SPS configuration associated with one of the multiple overlapping SPS occasions that may be not excluded. In some aspects, 920 may be performed by SPS component 1140 in FIG. 11.

At 922, the UE may receive a new transmission associated with one or more SPS occasions associated with the HARQ process while the SPS timer may be running. For example, the UE 502 may receive a new transmission (e.g., the SPS PDSCH 510) associated with one or more SPS occasions associated with the HARQ process while the SPS timer may be running. In some aspects, 922 may be performed by SPS component 1140 in FIG. 11.

At 924, the UE may skip receiving the new transmission associated with the one or more SPS occasions while the SPS timer may be running based on a condition or a configuration defined per carrier, for all carriers, or per SPS configuration. For example, the UE 502 may skip receiving the new transmission associated with the one or more SPS occasions while the SPS timer may be running based on a condition or a configuration defined per carrier, for all carriers, or per SPS configuration. In some aspects, 924 may be performed by SPS component 1140 in FIG. 11. In some aspects, the condition or configuration may include a time difference between one of the one or more SPS occasions and a previous SPS PDSCH associated with the one of the one or more SPS occasions. In some aspects, the condition or configuration may include a ACK associated with the SPS PDSCH associated with the HARQ process.

At 926, the UE may identify the new transmission as a retransmission of the SPS PDSCH. For example, the UE 502 may identify the new transmission (e.g., the SPS PDSCH 510) as a retransmission of the SPS PDSCH. In some aspects, 926 may be performed by SPS component 1140 in FIG. 11.

At 928, the UE may receive, from the base station, an indication indicating a termination of the SPS timer. For example, the UE 502 may receive, from the base station, an indication 518 indicating a termination of the SPS timer. In some aspects, 928 may be performed by SPS component 1140 in FIG. 11. In some aspects, the indication may be received via DCI or a MAC-CE. In some aspects, the indication may be based on a PDB. In some aspects, the indication may be received via a PDCCH with a C-RNTI associated with an ID of the HARQ process. In some aspects, the UE may initiate a PDB timer upon receiving a new SPS transmission associated with the HARQ process.

At 930, the UE may terminate the SPS timer. For example, the UE 502 may terminate the SPS timer at 520 based on expiration of the PDB timer, the SPS timer, or the ACK 516. In some aspects, 930 may be performed by SPS component 1140 in FIG. 11.

Figure 10:
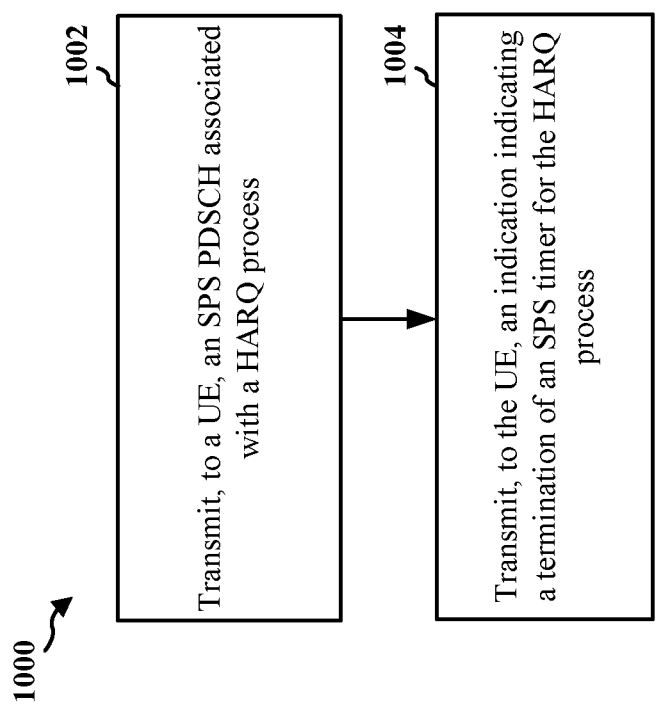
FIG. 10 is a flowchart of a method of wireless communication.

FIG. 10 is a flowchart 1000 of a method of wireless communication. The method may be performed by a base station (e.g., the base station 102/180, the base station 504; the apparatus 1202).

At 1002, the base station may transmit, to a UE, an SPS PDSCH associated with a HARQ process. For example, the base station 504 may transmit, to a UE 502, an SPS PDSCH 506 associated with a HARQ process. In some aspects, 1002 may be performed by SPS component 1240 in FIG. 12.

At 1004, the base station may transmit, to the UE, an indication indicating a termination of an SPS timer for the HARQ process. For example, the base station 504 may transmit, to the UE 502, an indication 518 indicating a termination of an SPS timer for the HARQ process. In some aspects, 1004 may be performed by SPS component 1240 in FIG. 12. In some aspects, the indication may be transmitted via DCI or a MAC-CE. In some aspects, the indication may be based on a PDB. In some aspects, the indication may be transmitted via a PDCCH with a C-RNTI associated with an ID of the HARQ process. In some aspects, the SPS timer may be one-to-one associated with the HARQ process.

Figure 11:
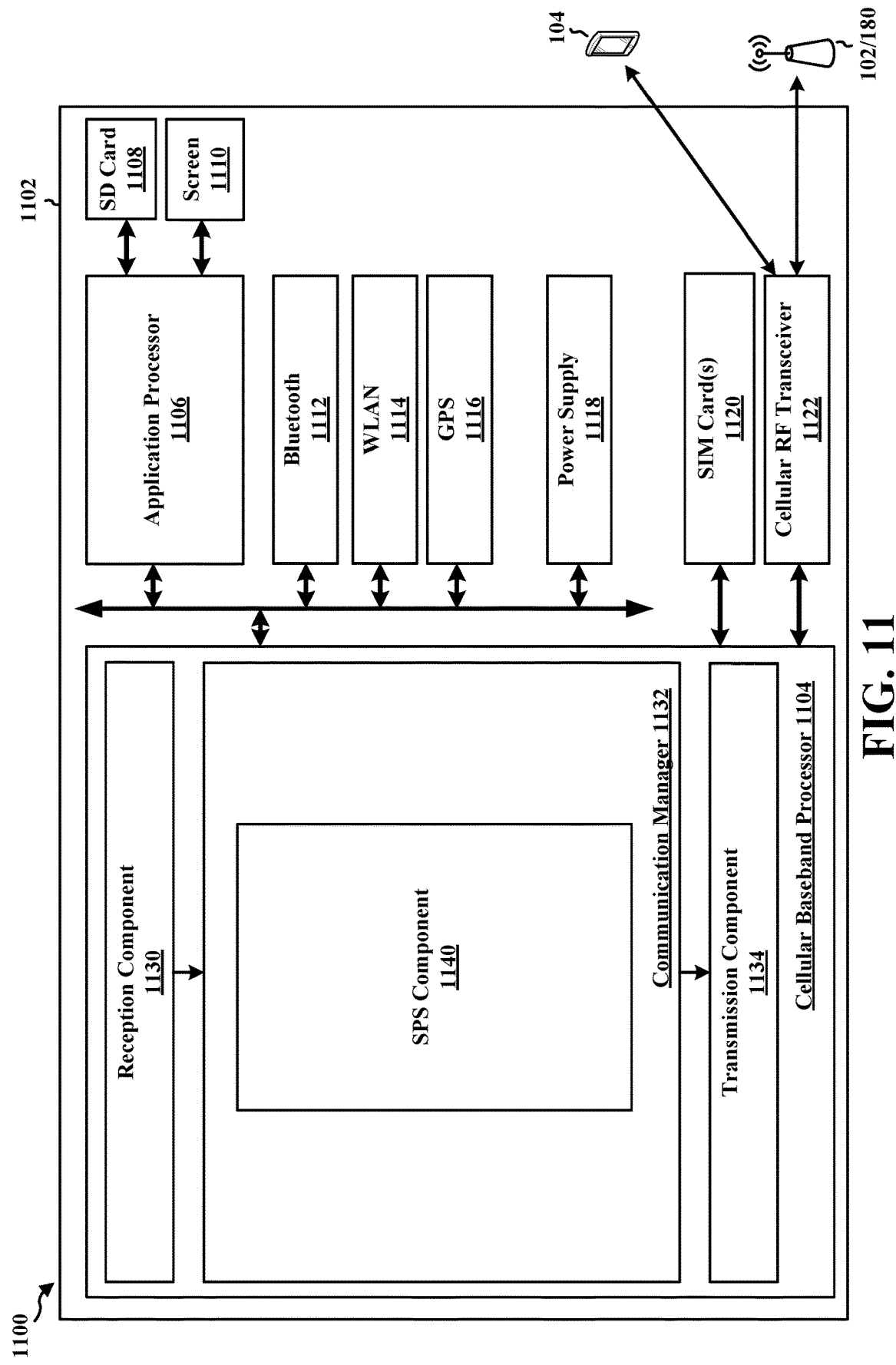
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include an SPS component 1140 that is configured to receive, from a base station, an SPS PDSCH associated with a HARQ process, e.g., as described in connection with 802 in FIGS. 8 and 902 in FIG. 9. The SPS component 1140 may be further configured to initiate an SPS timer for the HARQ process associated with the SPS PDSCH, e.g., as described in connection with 804 in FIGS. 8 and 904 in FIG. 9. The SPS component 1140 may be further configured to maintain the HARQ process to receive HARQ retransmissions associated with the HARQ process until the SPS timer expires, e.g., as described in connection with 806 in FIGS. 8 and 906 in FIG. 9. The SPS component 1140 may be further configured to decode data associated with the SPS PDSCH associated with the HARQ process, e.g., as described in connection 908 in FIG. 9. The SPS component 1140 may be further configured to transmit a positive acknowledgment based on decoding the data, e.g., as described in connection 910 in FIG. 9. The SPS component 1140 may be further configured to stop the SPS timer after transmitting the positive acknowledgment, e.g., as described in connection 912 in FIG. 9. The SPS component 1140 may be further configured to skip receiving a new transmission associated with one or more SPS occasions associated with the HARQ process while the SPS timer is running, e.g., as described in connection 914 in FIG. 9. The SPS component 1140 may be further configured to skip transmitting HARQ feedback associated with the new transmission while the SPS timer is running, e.g., as described in connection 916 in FIG. 9. The SPS component 1140 may be further configured to exclude the one or more SPS occasions when resolving multiple overlapping SPS occasions that overlap in time, e.g., as described in connection 918 in FIG. 9. The SPS component 1140 may be further configured to transmit an SPS configuration associated with one of the multiple overlapping SPS occasions that is not excluded, e.g., as described in connection 920 in FIG. 9. The SPS component 1140 may be further configured to receive a new transmission associated with one or more SPS occasions associated with the HARQ process while the SPS timer is running, e.g., as described in connection 922 in FIG. 9. The SPS component 1140 may be further configured to skip receiving the new transmission associated with the one or more SPS occasions while the SPS timer is running, e.g., as described in connection 924 in FIG. 9. The SPS component 1140 may be further configured to identify the new transmission as a retransmission of the SPS PDSCH, e.g., as described in connection 926 in FIG. 9. The SPS component 1140 may be further configured to receive, from the base station, an indication indicating a termination of the SPS timer, e.g., as described in connection 928 in FIG. 9. The SPS component 1140 may be further configured to terminate the timer, e.g., as described in connection 930 in FIG. 9.

The apparatus may include additional components that perform each of the blocks of the algorithm in the flowcharts of FIGS. 8-9. As such, each block in the flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for receiving, from a base station, an SPS PDSCH associated with a HARQ process. The cellular baseband processor 1104 may further include means for initiating an SPS timer for the HARQ process associated with the SPS PDSCH. The cellular baseband processor 1104 may further include means for maintaining the HARQ process to receive HARQ retransmissions associated with the HARQ process until the SPS timer expires. The cellular baseband processor 1104 may further include means for decoding data associated with the SPS PDSCH associated with the HARQ process. The cellular baseband processor 1104 may further include means for transmitting a positive acknowledgment based on decoding the data. The cellular baseband processor 1104 may further include means for stopping the SPS timer after transmitting the positive acknowledgment. The cellular baseband processor 1104 may further include means for skipping receiving a new transmission associated with one or more SPS occasions associated with the HARQ process while the SPS timer may be running. The cellular baseband processor 1104 may further include means for skipping transmitting HARQ feedback associated with the new transmission while the SPS timer may be running. The cellular baseband processor 1104 may further include means for excluding the one or more SPS occasions when resolving multiple overlapping SPS occasions that overlap in time. The cellular baseband processor 1104 may further include means for transmitting an SPS configuration associated with one of the multiple overlapping SPS occasions that may be not excluded. The cellular baseband processor 1104 may further include means for receiving a new transmission associated with one or more SPS occasions associated with the HARQ process while the SPS timer may be running. The cellular baseband processor 1104 may further include means for identifying the new transmission as a retransmission of the SPS PDSCH. The cellular baseband processor 1104 may further include means for receiving a new transmission associated with one or more SPS occasions associated with the HARQ process while the SPS timer may be running. The cellular baseband processor 1104 may further include means for identifying the new transmission as a retransmission of the SPS PDSCH. The cellular baseband processor 1104 may further include means for receiving a new transmission associated with one or more SPS occasions associated with the HARQ process while the SPS timer may be running. The cellular baseband processor 1104 may further include means for skipping receiving the new transmission associated with the one or more SPS occasions while the SPS timer may be running based on a condition defined per carrier, for all carriers, or per SPS configuration. The cellular baseband processor 1104 may further include means for receiving a new transmission associated with one or more SPS occasions associated with the HARQ process while the SPS timer may be running. The cellular baseband processor 1104 may further include means for skipping receiving the new transmission associated with the one or more SPS occasions while the SPS timer may be running based on a configuration that may be configured per carrier, for all carriers, or per SPS configuration. The cellular baseband processor 1104 may further include means for receiving, from the base station, an indication indicating a termination of the SPS timer. The cellular baseband processor 1104 may further include means for initiating a PDB timer upon receiving a new SPS transmission associated with the HARQ process. The cellular baseband processor 1104 may further include means for terminating the SPS timer upon expiration of the PDB timer. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
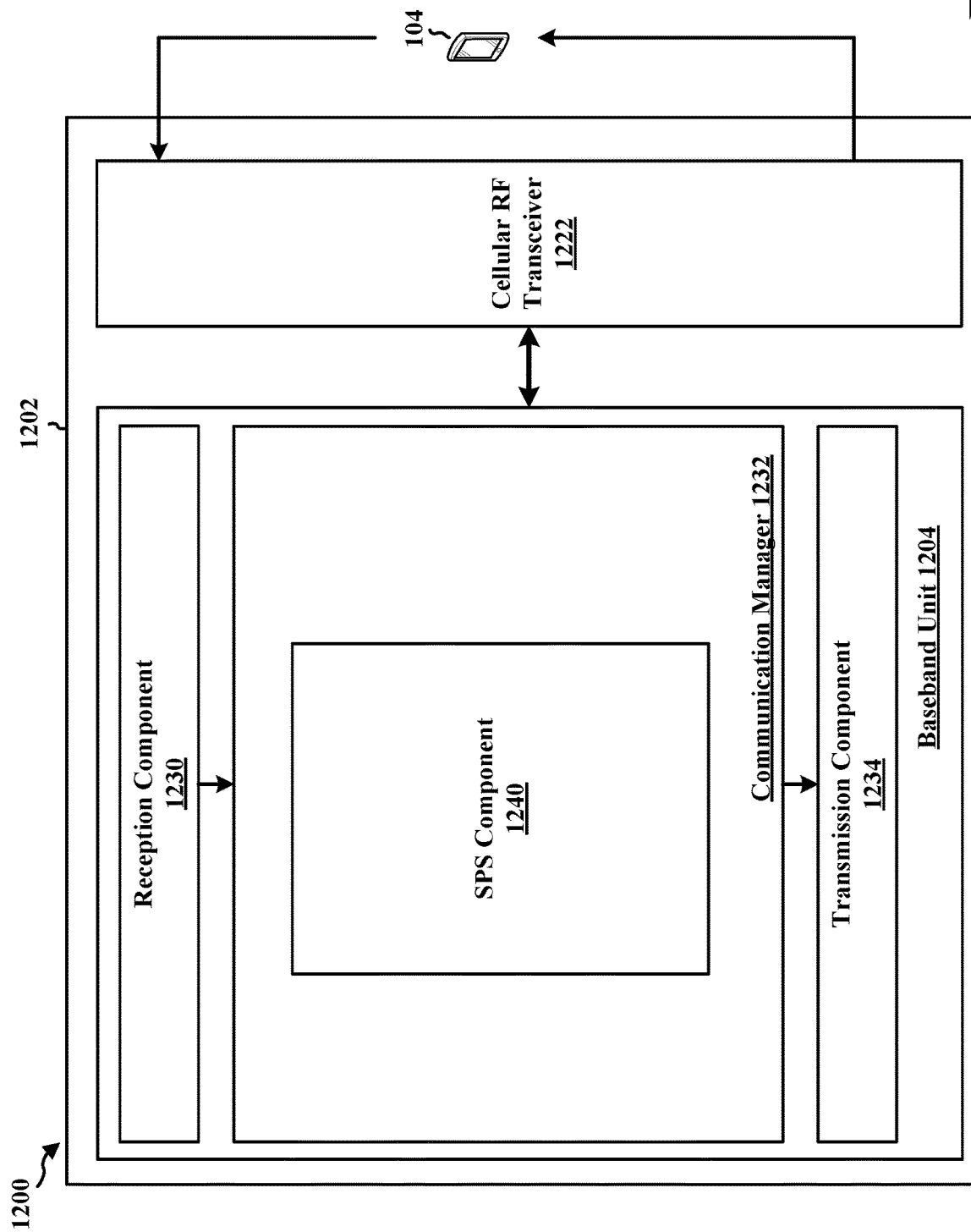
FIG. 12 is a diagram illustrating an example of a hardware implementation for an example apparatus.

FIG. 12 is a diagram 1200 illustrating an example of a hardware implementation for an apparatus 1202. The apparatus 1202 may be a base station, a component of a base station, or may implement base station functionality. In some aspects, the apparatus 1102 may include a baseband unit 1204. The baseband unit 1204 may communicate through a cellular RF transceiver 1222 with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the base station 310 and may include the memory 376 and/or at least one of the TX processor 316, the RX processor 370, and the controller/processor 375.

The communication manager 1232 may include an SPS component 1240 that may transmit, to a UE, an SPS PDSCH associated with a HARQ process or transmit, to the UE, an indication indicating a termination of an SPS timer for the HARQ process, e.g., as described in connection with FIG. 10.

The apparatus may include additional components that perform each of the blocks of the algorithm in the flowchart of FIG. 10. As such, each block in the flowchart of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the baseband unit 1204, may include means for transmitting, to a UE, an SPS PDSCH associated with a HARQ process. The baseband unit 1204 may further include means for transmitting, to the UE, an indication indicating a termination of an SPS timer for the HARQ process. The means may be one or more of the components of the apparatus 1202 configured to perform the functions recited by the means. As described supra, the apparatus 1202 may include the TX Processor 316, the RX Processor 370, and the controller/processor 375. As such, in one configuration, the means may be the TX Processor 316, the RX Processor 370, and the controller/processor 375 configured to perform the functions recited by the means.

Aspects provided herein configure an SPS timer for maintaining a HARQ process associated with the SPS. For example, for each HARQ process of an active SPS, an SPS timer may be defined. The SPS timer may indicate a time window that the UE expects to receive a potential HARQ retransmission of the corresponding HARQ process ID. By utilizing the SPS timer, rewritten HARQ process IDs that may cause inefficiencies in the transmission may be avoided.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a base station, a SPS PDSCH associated with a HARQ process; initiate an SPS timer for the HARQ process associated with the SPS PDSCH; and maintain the HARQ process to receive HARQ retransmissions associated with the HARQ process until the SPS timer expires.

Aspect 2 is the apparatus of aspect 1, wherein the SPS timer is initiated or reinitiated for the HARQ process based on a PDCCH associated with a CS-RNTI associated with an ID of the HARQ process, wherein the PDCCH is associated with a NDI of value 1.

Aspect 3 is the apparatus of any of aspects 1-2, wherein the SPS timer is initiated or reinitiated for the HARQ process based on a PDCCH associated with a C-RNTI associated with an ID of the HARQ process.

Aspect 4 is the apparatus of any of aspects 1-3, wherein the SPS timer is initiated for the HARQ process based on a NACK associated with the SPS PDSCH.

Aspect 5 is the apparatus of any of aspects 1-4, wherein the SPS timer is initiated for the HARQ process based on receiving the SPS PDSCH if the SPS timer is not yet initiated when receiving the SPS PDSCH.

Aspect 6 is the apparatus of any of aspects 1-5, wherein the at least one processor is further configured to: decode data associated with the SPS PDSCH associated with the HARQ process; transmit a positive acknowledgment based on decoding the data; and stop the SPS timer after transmitting the positive acknowledgment.

Aspect 7 is the apparatus of any of aspects 1-6, wherein a value of the SPS timer corresponding to a window size is semi-statically configured per UE, per carrier, or per SPS configuration.

Aspect 8 is the apparatus of any of aspects 1-7, wherein the at least one processor is further configured to: skip receiving a new transmission associated with one or more SPS occasions associated with the HARQ process while the SPS timer is running.

Aspect 9 is the apparatus of any of aspects 1-8, wherein the at least one processor is further configured to: skip transmitting HARQ feedback associated with the new transmission while the SPS timer is running.

Aspect 10 is the apparatus of any of aspects 1-9, wherein the at least one processor is further configured to: exclude the one or more SPS occasions when resolving multiple overlapping SPS occasions that overlap in time, wherein the multiple overlapping SPS occasions include the one or more SPS occasions.

Aspect 11 is the apparatus of any of aspects 1-10, wherein the at least one processor is further configured to: transmit an SPS configuration associated with one of the multiple overlapping SPS occasions that is not excluded.

Aspect 12 is the apparatus of any of aspects 1-11, wherein the at least one processor is further configured to: receive a new transmission associated with one or more SPS occasions associated with the HARQ process while the SPS timer is running; and identify the new transmission as a retransmission of the SPS PDSCH.

Aspect 13 is the apparatus of any of aspects 1-12, wherein the at least one processor is further configured to: receive a new transmission associated with one or more SPS occasions associated with the HARQ process while the SPS timer is running; or skip receiving the new transmission associated with the one or more SPS occasions while the SPS timer is running based on a condition defined per carrier, for all carriers, or per SPS configuration.

Aspect 14 is the apparatus of any of aspects 1-13, wherein the condition includes a time difference between one of the one or more SPS occasions and a previous SPS PDSCH associated with the one of the one or more SPS occasions.

Aspect 15 is the apparatus of any of aspects 1-14, wherein the at least one processor is further configured to: receive a new transmission associated with one or more SPS occasions associated with the HARQ process while the SPS timer is running; or skip receiving the new transmission associated with the one or more SPS occasions while the SPS timer is running based on a configuration that is configured per carrier, for all carriers, or per SPS configuration.

Aspect 16 is the apparatus of any of aspects 1-15, wherein the configuration includes a time difference between one of the one or more SPS occasions and a previous SPS PDSCH associated with the one of the one or more SPS occasions.

Aspect 17 is the apparatus of any of aspects 1-16, wherein the configuration includes a ACK associated with the SPS PDSCH associated with the HARQ process.

Aspect 18 is the apparatus of any of aspects 1-17, wherein the at least one processor is further configured to: receive, from the base station, an indication indicating a termination of the SPS timer.

Aspect 19 is the apparatus of any of aspects 1-18, wherein the indication is received via DCI or a MAC-CE.

Aspect 20 is the apparatus of any of aspects 1-19, wherein the indication is based on a PDB.

Aspect 21 is the apparatus of any of aspects 1-20, wherein the indication is received via a PDCCH with a C-RNTI associated with an ID of the HARQ process.

Aspect 22 is the apparatus of any of aspects 1-21, wherein the at least one processor is further configured to: initiate a PDB timer upon receiving a new SPS transmission associated with the HARQ process; and terminate the SPS timer upon expiration of the PDB timer.

Aspect 23 is the apparatus of any of aspects 1-22, wherein the expiration of the PDB timer is based on exceeding the PDB.

Aspect 24 is the apparatus of any of aspects 1-23, further comprising a transceiver coupled to the at least one processor, wherein the SPS timer is one-to-one associated with the HARQ process.

Aspect 25 is an apparatus for wireless communication at a base station, comprising: a memory; and at least one processor coupled to the memory and configured to: transmit, to a UE, a SPS PDSCH associated with a HARQ process; and transmit, to the UE, an indication indicating a termination of an SPS timer for the HARQ process.

Aspect 26 is the apparatus of aspect 25, wherein the indication is transmitted via DCI or a MAC-CE.

Aspect 27 is the apparatus of any of aspects 25-26, wherein the indication is based on a PDB.

Aspect 28 is the apparatus of any of aspect 25-27, further comprising a transceiver coupled to the at least one processor, wherein the SPS timer is one-to-one associated with the HARQ process.

Aspect 29 is a method of wireless communication for implementing any of aspects 1 to 24.

Aspect 30 is an apparatus for wireless communication including means for implementing any of aspects 1 to 24.

Aspect 31 is a computer-readable medium storing computer executable code, where the code when executed by a processor causes the processor to implement any of aspects 1 to 24.

Aspect 32 is a method of wireless communication for implementing any of aspects 25 to 28.

Aspect 33 is an apparatus for wireless communication including means for implementing any of aspects 25 to 28.

Aspect 34 is a computer-readable medium storing computer executable code, where the code when executed by a processor causes the processor to implement any of aspects 25 to 28.

What is claimed is:

1. An apparatus for wireless communication at a user equipment (UE), comprising:
   memory; and
   at least one processor coupled to the memory and configured to:
      receive, from a base station, a semi-persistent scheduling (SPS) physical downlink shared channel (PDSCH) associated with a hybrid automatic repeat request (HARQ) process;
      initiate an SPS timer for the HARQ process associated with the SPS PDSCH;
      maintain the HARQ process to receive HARQ retransmissions associated with the HARQ process until the SPS timer expires; and
      skip receiving a new transmission associated with one or more SPS occasions associated with the HARQ process while the SPS timer is running.

2. The apparatus of claim 1, wherein to initiate the SPS timer, the at least one processor is configured to initiate or reinitiate the SPS timer for the HARQ process based on a physical downlink control channel (PDCCH) associated with a configured scheduling (CS) radio network temporary identifier (CS-RNTI) associated with an identifier (ID) of the HARQ process, wherein the PDCCH is associated with a new data indicator (NDI) of value 1.

3. The apparatus of claim 1, wherein to initiate the SPS timer, the at least one processor is configured to initiate or reinitiate the SPS timer for the HARQ process based on a physical downlink control channel (PDCCH) associated with a cell (C) radio network temporary identifier (C-RNTI) associated with an identifier (ID) of the HARQ process.

4. The apparatus of claim 1, wherein to initiate the SPS timer, the at least one processor is configured to initiate the SPS timer for the HARQ process based on a negative-acknowledgment (NACK) associated with the SPS PDSCH.

5. The apparatus of claim 1, wherein to initiate the SPS timer, the at least one processor is configured to initiate the SPS timer for the HARQ process based on receiving the SPS PDSCH if the SPS timer is not yet initiated when receiving the SPS PDSCH.

6. The apparatus of claim 1, wherein the at least one processor is further configured to:
   decode data associated with the SPS PDSCH associated with the HARQ process;
   transmit a positive acknowledgment based on decoding the data; and stop the SPS timer after transmitting the positive acknowledgment.

7. The apparatus of claim 1, wherein a value of the SPS timer corresponding to a window size is semi-statically configured per UE, per carrier, or per SPS configuration.

8. The apparatus of claim 1, wherein the at least one processor is further configured to:
skip transmitting HARQ feedback associated with the new transmission while the SPS timer is running.

9. The apparatus of claim 8, wherein the at least one processor is further configured to:
exclude the one or more SPS occasions when resolving multiple overlapping SPS occasions that overlap in time, wherein the multiple overlapping SPS occasions include the one or more SPS occasions.

10. The apparatus of claim 9, wherein the at least one processor is further configured to:
transmit an SPS configuration associated with one of the multiple overlapping SPS occasions that is not excluded.

11. The apparatus of claim 1, wherein the at least one processor is further configured to:
receive a new transmission associated with one or more SPS occasions associated with the HARQ process while the SPS timer is running; and
identify the new transmission as a retransmission of the SPS PDSCH.

12. The apparatus of claim 1, wherein the at least one processor is further configured to:
receive a new transmission associated with one or more SPS occasions associated with the HARQ process while the SPS timer is running; or
skip receiving the new transmission associated with the one or more SPS occasions while the SPS timer is running based on a condition defined per carrier, for all carriers, or per SPS configuration.

13. The apparatus of claim 12, wherein the condition includes a time difference between one of the one or more SPS occasions and a previous SPS PDSCH associated with the one of the one or more SPS occasions.

14. The apparatus of claim 1, wherein the at least one processor is further configured to:
receive a new transmission associated with one or more SPS occasions associated with the HARQ process while the SPS timer is running; or
skip receiving the new transmission associated with the one or more SPS occasions while the SPS timer is running based on a configuration that is configured per carrier, for all carriers, or per SPS configuration.

15. The apparatus of claim 14, wherein the configuration includes a time difference between one of the one or more SPS occasions and a previous SPS PDSCH associated with the one of the one or more SPS occasions.

16. The apparatus of claim 14, wherein the configuration includes a positive acknowledgment (ACK) associated with the SPS PDSCH associated with the HARQ process.

17. The apparatus of claim 1, wherein the at least one processor is further configured to:
receive, from the base station, an indication indicating a termination of the SPS timer.

18. The apparatus of claim 17, wherein to receive the indication, the at least one processor is configured to receive the indication via downlink control information (DCI) or a medium access control (MAC) control element (MAC-CE).

19. The apparatus of claim 17, wherein the indication is based on a packet delay budget (PDB).

20. The apparatus of claim 19, wherein to receive the indication, the at least one processor is configured to receive the indication via a physical downlink control channel (PDCCH) with a cell (C) radio network temporary identifier (C-RNTI) associated with an identifier (ID) of the HARQ process.

21. The apparatus of claim 20, wherein the at least one processor is further configured to:
initiate a PDB timer upon receiving a new SPS transmission associated with the HARQ process; and
terminate the SPS timer upon expiration of the PDB timer.

22. The apparatus of claim 21, wherein the expiration of the PDB timer is based on exceeding the PDB.

23. The apparatus of claim 1, further comprising a transceiver coupled to the at least one processor, wherein the SPS timer is one-to-one associated with the HARQ process.

24. An apparatus for wireless communication at a base station, comprising:
memory; and
at least one processor coupled to the memory and configured to:
transmit, to a user equipment (UE), a semi-persistent scheduling (SPS) physical downlink shared channel (PDSCH) associated with a hybrid automatic repeat request (HARQ) process; and
transmit, to the UE, an indication indicating a termination of an SPS timer for skipping a reception associated with the HARQ process and maintaining the HARQ process before the SPS timer expires.

25. The apparatus of claim 24, wherein to transmit the indication, the at least one processor is configured to transmit the indication via downlink control information (DCI) or a medium access control (MAC) control element (MAC-CE).

26. The apparatus of claim 24, wherein the indication is based on a packet delay budget (PDB).

27. The apparatus of claim 24, further comprising a transceiver coupled to the at least one processor, wherein the SPS timer is one-to-one associated with the HARQ process.

28. A method for wireless communication at a user equipment (UE), comprising:
receiving, from a base station, a semi-persistent scheduling (SPS) physical downlink shared channel (PDSCH) associated with a hybrid automatic repeat request (HARQ) process;
initiating an SPS timer for the HARQ process associated with the SPS PDSCH; and
maintaining the HARQ process to receive HARQ retransmissions associated with the HARQ process until the SPS timer expires;
wherein a value of the SPS timer corresponding to a window size is semi-statically configured per UE, per carrier, or per SPS configuration.

29. A method for wireless communication at a base station, comprising:
transmitting, to a user equipment (UE), a semi-persistent scheduling (SPS) physical downlink shared channel (PDSCH) associated with a hybrid automatic repeat request (HARQ) process; and
transmitting, to the UE, an indication indicating a termination of an SPS timer for skipping a reception associated with the HARQ process and maintaining the HARQ process before the SPS timer expires.

\* \* \* \* \*